(12) United States Patent
Ruf et al.

(10) Patent No.: US 12,699,076 B2
(45) Date of Patent: Aug. 4, 2026

(54) TESTING A SAMPLING UNIT FLUIDICALLY COUPLED TO A SOURCE

(71) Applicant: Agilent Technologies, Inc., Santa Clara, CA (US)

(72) Inventors: Dominik Ruf, Baden Weurttemberg (DE); Thomas Ortmann, Straubenhardt/Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 196 days.

(21) Appl. No.: 18/037,714

(22) PCT Filed: Nov. 19, 2021

(86) PCT No.: PCT/IB2021/060742
§ 371 (c)(1),
(2) Date: May 18, 2023

(87) PCT Pub. No.: WO2022/112911
PCT Pub. Date: Jun. 2, 2022

(65) Prior Publication Data
US 2024/0011957 A1     Jan. 11, 2024

(30) Foreign Application Priority Data
Nov. 30, 2020     (GB) ...................................... 2018799

(51) Int. Cl.
*G01N 30/86*     (2006.01)
*G01N 30/02*     (2006.01)
(Continued)

(52) U.S. Cl.
CPC ......... *G01N 30/8658* (2013.01); *G01N 30/20* (2013.01); *G01N 30/24* (2013.01); *G01N 30/32* (2013.01); *G01N 2030/027* (2013.01)

(58) Field of Classification Search
CPC .... G01N 30/8658; G01N 30/20; G01N 30/24; G01N 30/32; G01N 2030/027
See application file for complete search history.

(56) References Cited

U.S. PATENT DOCUMENTS 5,804,142 A      9/1998  Ito et al.
10,371,671 B2 *  8/2019  Ortmann ................ G01N 30/04
(Continued)

FOREIGN PATENT DOCUMENTS

CN      107860854 A      3/2018
CN      111307984 A      6/2020
(Continued)

OTHER PUBLICATIONS

PCT Notification of Transmittal of The International Search Report & Written Opinion mailed on Feb. 18, 2022 for Application No. PCT/IB2021/060742; 14 Pages.
(Continued)

*Primary Examiner* — Ryan D Walsh

(57)     ABSTRACT
A sampling unit is fluidically coupled to a source. The sampling unit is configured for receiving a fluidic sample from the source and chromatographically separating the received fluidic sample. The sampling unit is operated to introduce a test sample into the source. At least a portion of the introduced test sample from the source is received into the sampling unit, and the received portion of the test sample is chromatographically separated in the sampling unit.

20 Claims, 10 Drawing Sheets

(51) Int. Cl.
  *G01N 30/20*    (2006.01)
  *G01N 30/24*    (2006.01)
  *G01N 30/32*    (2006.01)

(56)          References Cited

U.S. PATENT DOCUMENTS

| 2007/0075242 | A1 | 4/2007 | Kruis |
| 2013/0304393 | A1 | 11/2013 | Sutan |
| 2014/0338431 | A1* | 11/2014 | Hochgraeber ..... G01N 35/1097 |
| | | | 73/61.55 |
| 2016/0195564 | A1 | 7/2016 | Hewitson et al. |
| 2017/0315025 | A1 | 11/2017 | Aono |
| 2017/0343520 | A1 | 11/2017 | Ortmann et al. |
| 2019/0079061 | A1 | 3/2019 | Unnerstall et al. |
| 2020/0309743 | A1* | 10/2020 | Cormier ................. G01N 30/16 |
| 2020/0319146 | A1* | 10/2020 | Hollnagel ............ G01N 30/461 |

FOREIGN PATENT DOCUMENTS

| EP | 1577012 | A1 | 9/2005 |
| EP | 3252463 | A1 | 12/2017 |
| WO | 2005038450 | A2 | 4/2005 |
| WO | 2007012643 | A1 | 2/2007 |

OTHER PUBLICATIONS

Chinese office action and search report dated Mar. 27, 2026 for Application No. 202180080569.1; 8 pages.

* cited by examiner

TESTING A SAMPLING UNIT FLUIDICALLY COUPLED TO A SOURCE

RELATED APPLICATIONS

This application is the national stage under 35 U.S.C. 371 of International Application No. PCT/IB2021/060742, filed Nov. 19, 2021; which claims priority to UK Application No. GB 2018799.3, filed Nov. 30, 2020; the entire contents of each of which are incorporated by reference herein.

TECHNICAL FIELD

The present invention relates to a sampling unit fluidically coupled to a source.

BACKGROUND

In liquid chromatography such as high-performance liquid chromatography (HPLC), a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high-pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

Injector valves may be configured as rotatable valves having a stator (which may have one or a plurality of fluid ports) and a rotor (which may have a plurality of grooves for connecting respective ones of the fluid ports) being rotatable with regard to the stator to thereby establish a desired fluid communication state between fluid ports and grooves. In order to be capable to withstand high pressure values of for instance up to 1200 bar in a fluid tight manner, it is necessary to press the rotor against the stator.

In certain applications, an HPLC device is fluidically coupled to a biological and/or chemical reactor in order to monitor operation of such reactor. Typically, a flow path is branched off from the reactor, and the HPLC unit is coupled to such flow path in order to draw, e.g. periodically, one or more samples from the flow path and chromatographically separate and analyze the drawn samples.

EP3252463A1 by the same applicant discloses branching off fluidic sample with low influence on a source flow path which may be a flow path branched off from a reactor.

HPLC devices and reactors are typically provided by different manufacturers and often coupled together at a site of application e.g. with a customer. Interoperability of the HPLC device and the reactor as well as tracing potential faults in the common setup of HPLC device and reactor is of high importance and may turn out to be a challenge in view of the different suppliers.

SUMMARY

It is an object of the present disclosure to improve interoperability between a source, such as a chemical and/or biological reactor, and a sampling unit, such as an HPLC device, coupled to such source for chromatographically separating fluidic samples received from the source.

According to an embodiment of the present disclosure, a method of testing a sampling unit fluidically coupled to a source is provided. The sampling unit is configured for receiving a fluidic sample from the source and chromatographically separating the received fluidic sample. The method comprises operating the sampling unit to introduce a test sample into the source, receiving at least a portion of the introduced test sample from the source into the sampling unit, and chromatographically separating the received portion of the test sample in the sampling unit. This allows drawing conclusions on the operation of either one or both of the sampling unit and the source. In particular, a "self-test" for the sampling unit can be provided for example to verify proper operation of the sampling unit.

In a "normal mode of operation", the sampling unit may draw fluidic samples from the source and chromatographically separate such drawn fluidic samples. This may be provided, for example following a given time pattern, to monitor the source, for example to monitor a biological and/or chemical reaction occurring in a reactor of the source. In order to monitor proper operation in particular proper operation of the sampling unit, the "self-test" or "troubleshooting procedure" may be executed for example following a given time pattern (e.g. following given time intervals).

In one embodiment, receiving the fluidic sample from the source comprises at least one of: removing, drawing, branching off the fluidic sample from the source. This allows minimizing an influence on the source as resulting from fluidically coupling to the source.

In one embodiment, receiving the portion of the introduced test sample from the source into the sampling unit comprises at least one of removing, drawing, branching off the portion of the introduced test sample from the source into the sampling unit. This allows minimizing an influence on the source as resulting from fluidically coupling to the source.

In one embodiment, the method further comprises, after introducing the test sample into the source and before receiving the portion of the introduced test sample from the source into the sampling unit, purging the sampling unit. This may allow removing remaining portions of the test sample within the sampling unit, such as by purging at least such components of the sampling unit required for chromatographically separating the received portion.

In one embodiment, the method further comprises, after introducing the test sample into the source and before receiving the portion of the introduced test sample from the source into the sampling unit, stopping or at least reducing a flow in the source. This allows ensuring that the introduced test sample can still be received and is not distributed too far away.

In one embodiment, the method further comprises reducing a time period after introducing the test sample into the source and before receiving the portion of the introduced test sample from the source into the sampling unit. This allows ensuring that the introduced test sample can still be received, for example that the introduced test sample has not been distributed too far away e.g. from a fluidic coupling point of the sampling unit with the source.

In one embodiment, the sampling unit comprises a metering unit configured for metering fluidic volumes. The method may comprise operating the sampling unit to introduce the test sample into the source by using the metering unit to aspirate the test sample, e.g. from a source external to the sampling unit, such as a vial or other kind of container. Alternatively or in addition, the method may comprise operating the sampling unit to introduce the test sample into the source by using the metering unit to inject the test sample into the source. Alternatively or in addition, the method may comprise receiving the portion of the introduced test sample from the source into the sampling unit by using the metering unit to draw in the portion of the introduced test sample from the source into the sampling unit. Alternatively or in addition, the method may comprise chromatographically separating the received portion of the test sample in the sampling unit by using the metering unit to eject the received portion of the test sample into a high flow path for chromatographic separating, such as by one of: flow through injection and feed injection.

In one embodiment, the method comprises comparing an actual result (such as a chromatogram) from the chromatographic separation of the received portion of the test sample with a reference result (such as a chromatogram) for a chromatographic separation of the test sample, such as derived from a chromatographic separation of a portion of the test sample before introducing another portion of the test sample into the source. The method may further comprise concluding from the comparison of the actual result with the reference result for the test sample on at least one of:

a proper operation of the sampling unit, such as in case the actual result and the reference result match within a given threshold;

a non-proper operation of the sampling unit, such as in case the actual result and the reference result do not match within a given threshold;

a proper fluidic coupling of the sampling unit with the source, such as in case the actual result and the reference result match within a given threshold;

a non-proper fluidic coupling of the sampling unit with the source, such as in case the actual result and the reference result do not match within a given threshold;

a proper quantification of the received portion of the test sample, such as in case the actual result and the reference result match within a given threshold;

a proper purging of the source before receiving the test sample from the source, such as in case the actual result contains one or more other separated compounds than the reference result, such as beyond a given threshold;

a proper purging of the sampling unit before receiving the test sample from the source, such as in case the actual result contains one or more other separated compounds than the reference result, such as beyond a given threshold.

In one embodiment, a method of operating a sampling unit fluidically coupled to a source is provided. The method comprises operating the sampling unit to receive a fluidic sample from the source and chromatographically separating the received fluidic sample, and testing the sampling unit according to any one of the aforementioned embodiments.

In one embodiment, the method further comprises branching off a volume of fluid from a reactor into the source, receiving the fluidic sample from the branched off volume of fluid from the reactor, and chromatographically separating the received fluidic sample from the branched off volume of fluid from the reactor.

In one embodiment, a sampling unit fluidically coupled to a source is provided. The sampling unit is configured for receiving a fluidic sample from the source and chromatographically separating the received fluidic sample. The sampling unit comprises a fluid drive configured for driving a mobile phase, a metering unit configured for metering fluidic volumes, a separation unit configured for providing a chromatographic separation, a coupling unit for fluidically coupling with the source, and a control unit. The control unit is configured for operating the metering unit to introduce a test sample into the source, operating the metering unit to draw in at least a portion of the introduced test sample from the source into the sampling unit, and operating the metering unit to eject the drawn in portion of the test sample into the mobile phase for chromatographically separating the drawn in portion of the test sample by the separation unit.

In one embodiment, the control unit is further configured for comparing an actual result (such as a chromatogram) from the chromatographic separation of the received portion of the test sample with a reference result (such as a chromatogram) for a chromatographic separation of the test sample, such as derived from a chromatographic separation of a portion of the test sample before introducing another portion of the test sample into the source. The control unit may further comprise concluding from the comparison of the actual result with the reference result for the test sample on at least one of:

a proper operation of the sampling unit, such as in case the actual result and the reference result match within a given threshold;

a non-proper operation of the sampling unit, such as in case the actual result and the reference result do not match within a given threshold;

a proper fluidic coupling of the sampling unit with the source, such as in case the actual result and the reference result match within a given threshold;

a non-proper fluidic coupling of the sampling unit with the source, such as in case the actual result and the reference result do not match within a given threshold;

a proper quantification of the received portion of the test sample, such as in case the actual result and the reference result match within a given threshold;

a proper purging of the source before receiving the test sample from the source, such as in case the actual result contains one or more other separated compounds than the reference result, such as beyond a given threshold;

a proper purging of the sampling unit before receiving the test sample from the source, such as in case the actual result contains one or more other separated compounds than the reference result, such as beyond a given threshold.

In one embodiment, the source comprises a source container configured for containing a source fluid.

In one embodiment, the source comprises a source flow path configured for channeling a flow of a source fluid.

In one embodiment, the source comprises a source container and a source flow path, wherein the source container is configured for containing a source fluid, and the source flow path is configured for channeling a flow of the source fluid branched off from the source container.

In one embodiment, source container is a reactor configured for subjecting the source fluid to at least one of a chemical and biological reaction.

In one embodiment, the source flow path comprises a source pump configured for pumping the source fluid.

In one embodiment, the source flow path comprises a tubing for channeling the flow of the source fluid.

According to an exemplary embodiment of the present disclosure, a sample management device is provided which comprises a source in which a fluidic sample can flow, a volume flow adjustment unit (such as a metering unit) configured for adjusting a volume flow of the fluidic sample to be branched off from the source at a fluidic coupling point, and a fluidic valve fluidically coupled with the source and with the volume flow adjustment unit, wherein the fluidic valve is switchable into a branch off state in which the fluidic coupling point is established within (in particular by a switching procedure of switching the fluidic valve) or is coupled into the source to branch off an adjustable volume of the fluidic sample from the source via the fluidic coupling point while a flow of the fluidic sample in the source continues.

According to still another exemplary embodiment, a sampling unit for separating a fluidic sample is provided, wherein the sampling unit comprises a fluid drive configured for driving a mobile phase, a separation unit configured for separating the fluidic sample in the mobile phase, and a sample management device having the above-mentioned features for branching off an adjusted volume the fluidic sample for injection between the fluid drive and the separation unit.

According to an exemplary embodiment of the present disclosure, a sample management system is provided which allows to branch off a defined amount of a fluidic sample from a source without disturbing flow of the fluidic sample in this source. This can be accomplished by a fluidic valve which is capable of establishing, generating or switching a fluidic coupling point (such as a fluidic T-point) into the source so as to temporarily initiate a flow of a specific amount of the fluidic sample from the source via the fluidic coupling point into a fluid accommodation volume in fluid communication with a volume flow adjustment unit. The volume flow adjustment unit may have the capability of precisely adjusting a volume of the fluidic sample to be branched off. Such an adjustment may be accomplished in such a way that the conditions in the source remain substantially undisturbed, so that any process in the source by which the fluidic sample is processed may continue regardless of the branching off of a specific portion of the fluidic sample. This allows for simultaneously monitoring an ongoing sample processing in the source. By the concept of the temporarily establishing the fluidic coupling point within the source, a remaining very small influence on the source may be limited not only in terms of intensity but also in terms of time. Thus, a certain amount of fluidic sample which can be precisely controlled and defined by the volume flow adjustment unit can be branched off from the substantially undisturbed source. Advantageously, an only temporary switching of the fluidic coupling point for establishing a fluidic connection between the source and the volume flow adjustment unit keeps the dead volume in the fluidic system very small, thereby reducing issues in terms of undesired carry-over of fluidic sample, etc.

In an embodiment, the temporarily established fluidic connection point or flow coupler is configured as a fluidic T-piece, a fluidic Y-piece, or a fluidic X-piece. In case of a fluidic T-piece and a fluidic Y-piece, two flow streams are combined at one bifurcation point into a single outlet path. In the case of a fluidic X-piece, there may be one further fluid conduit. This further fluid conduit can be a second fluid outlet conduit or a third fluid inlet conduit. Other kinds of flow couplers are possible as well.

In an embodiment, the fluidic valve is configured so that a flow of the fluidic sample in the source continues substantially undisturbed in the branch off state. The term "substantially undisturbed in the branch off state" may particularly denote that a flow rate, a pressure, a fluid processing, etc. may remain substantially constant during branching off.

In particular, the fluidic valve may be configured so that a flow of the fluidic sample in the source continues uninterruptedly in the branch off state. In the context of the present application, the term "flow of the fluidic sample in the source continues uninterruptedly in the branch off state" may particularly denote that artefacts in a pressure curve concerning the fluidic sample in the source can be suppressed or even eliminated, since the flow of the fluidic sample is never reduced to zero regardless of branching off fluidic sample.

This can be accomplished by keeping the pressure conditions in a fluidic path connected to the volume flow adjustment unit on the one hand and in the source on the other hand as similar as possible so as to avoid pressure peaks or switching artefacts or even an undesired pressure reduction or increase upon switching the volume flow adjustment unit into fluid communication with the source. At the fluidic coupling point, which may be a fluidic T-point within the fluidic valve, a portion of the fluidic sample may continue to flow through the source while another portion may be split towards the volume flow adjustment unit as a consequence of the establishing of the fluidic coupling point within the source and within the fluidic valve.

In an embodiment, the volume flow adjustment unit comprises an adjustment pump, in particular a metering pump. In particular, the volume flow adjustment unit may comprise a piston which can be configured for moving selectively forwardly or backwardly within a piston chamber. By such a forward or backward motion, in particular in conjunction with a corresponding pressure provided by the piston, the pressure conditions between volume flow adjustment unit and source may be precisely controlled. Therefore, the configuration of the volume flow adjustment unit as such a piston driven pump is highly advantageous.

In an embodiment, the adjustment pump is configured for adjusting the volume of the fluidic sample to be branched off from the source. Control of the pumping characteristics can be accomplished by controlling the time over position trajectory of the piston. For branching off, a controlled amount (such as a controlled volume or—for a temperature independent or pressure independent operation—a controlled amount of molecules) of fluidic sample can be branched off at the fluidic coupling point.

Prior to connecting the adjustment pump with the source, it is possible that the pressure in a sample accommodation volume (which may be a sample loop) in fluid connection with the adjustment pump is brought to (or close to) a pressure of the source (such as a reactor). After branching off fluidic sample from the source into the sample accommodation volume, it is possible that the adjustment pump carries out a pressure adjustment (for instance by a piston of the adjustment pump driving in a backward direction for accomplishing a pressure release of the fluid). In a further embodiment, a negative pressure operation of a reactor can be carried out, i.e. accomplishing pressure reduction for switching the sample accommodation volume in fluid connection with the source, and pressure increase (for instance ambient pressure) for fluidically decoupling the sample accommodation volume from the source. However, it should be said that the description herein is independent of absolute pressure (for instance in a pressure range between 0 and 2000 bar).

In an embodiment, the volume flow adjustment unit comprises or consists of a predefined fluidic restriction. Such a predefined fluidic restriction may be a barrier for the fluidic sample flowing from the fluidic coupling point towards the fluidic restriction. Therefore, such a fluidic restriction limits the amount of fluidic sample split or branched off towards the volume flow adjustment unit. Thus, a completely passive and hence very simple configuration of the volume flow adjustment unit is possible in which the volume flow is adjusted by the value of a fluidic resistance.

In an embodiment, the volume of the fluidic sample to be branched off from the source flows into a sample accommodation volume, in particular a sample loop. Such a sample accommodation volume may be a defined storage volume for the branched off fluidic sample to assume before the branched off fluidic sample is transported to a destination for further fluid processing.

In an embodiment, the sample management device comprises a sampling unit fluidically coupled with the fluidic valve being switchable into a sample supply state in which the branched off fluidic sample is supplied into the sampling unit. Thus, by a further switching of the fluidic valve into the sample supply state, the previously branched off fluidic sample can be transported to a sampling unit for further fluid processing. Advantageously, introducing the branched off amount of fluidic sample into the sampling unit may also be carried without disturbing or interrupting fluid processing in the sampling unit.

In an embodiment, the source is configured for closed-loop fluid processing. Thus, the fluidic sample may be continuously processed in the source, for instance driven by a pump.

In an embodiment, the source comprises a fluid reactor for subjecting the fluidic sample to a reaction. When a fluid reactor is implemented in or as the source, the result of the reaction of the fluidic sample in the reactor may be branched off by the volume flow adjustment unit for further processing. Thus, a reaction can be monitored quasi-continuously without disturbing the reaction in the source.

In an embodiment, the source comprises a further sample separation apparatus for separating the fluidic sample in fractions (for instance by liquid chromatography). Therefore, the fluidic sample separated into fractions in the source may be branched off, for instance fraction-wise, by the volume flow adjustment unit. For instance, the volume flow adjustment unit may form part of a fraction collector.

In an embodiment, the further sampling unit is configured for further separating the fractions in sub-fractions. In this configuration, it is in particular possible that the system of source, fluidic valve and sampling unit form a two-dimensional sample separation apparatus or system, in particular a two-dimensional liquid chromatography sample separation apparatus or system (2DLC). A flow from the first dimension into the second dimension may be transferred substantially without influencing the fluid separation in the first dimension. In such an embodiment, a fluidic sample (for instance including one fraction) is taken out of the first dimension and is supplied to the second dimension. The separation in the first dimension keeps uninfluenced from the branching off, since the fluidic sample may be branched off from the source only downstream of a separation unit and without flow interruption.

In an embodiment, the sample management device comprises a needle, a seat and an accommodation volume between the volume flow adjustment unit and the fluidic valve, wherein the needle is drivable selectively into the seat or out of the seat for transferring a substance between the accommodation volume and an external entity, in particular a fluid container. Thus, the portion of the sample supply device between the fluidic coupling point and the volume flow adjustment unit, including needle, seat and accommodation volume, may be configured as an injector. The needle may drive out of the seat for injecting fluidic sample which has been previously branched off from a source into a separate apparatus, for instance a separate liquid chromatography apparatus. But it is also possible that the needle drives into a fluid container such as a vial before intaking a medium.

In an embodiment, the fluidic valve comprises a stator and a rotor being rotatable relative to one another, wherein the stator comprises a plurality of ports and optionally one or more fluid conduits, and the rotor comprises at least one fluid conduit (in particular a plurality of fluid conduits, such as one or more grooves). The conduit(s) may be selectively fluidically coupled with or decoupled from the stator ports by rotating the rotor relative to the stator.

In an embodiment, the fluidic valve has at least the following ports (which may be established as part of a stator of a rotatable fluidic valve):

a source flow-in port through which the fluidic sample can be guided to flow from the source into the fluidic valve;

a source flow-out port (which may be equal to the fluidic coupling point, for instance in the branch off state) through which branched off fluidic sample can flow away from the source and not-branched off fluidic sample can remain flowing within the source; and a branch off port (which may be a central port of the fluidic valve) through which the branched off fluidic sample can flow to a sample accommodation volume in fluid communication with the volume flow adjustment unit.

By such a valve configuration, branching off a portion of the fluidic sample may be accomplished with very low impact on the source and with small dead volume.

Correspondingly, the fluidic valve may have an "in" and an "out" connection for the source as well as a channel end point, which may be fluidically coupled to the volume flow adjustment unit, for providing or establishing the fluidic coupling point (in particular in a dedicated switching state of the fluidic valve such as the branch off state).

In an embodiment, the fluidic valve is switchable into at least one other state (i.e. in a switching state which differs from the branch off state) in which no fluidic coupling point (of the above described type) fluidically coupling the volume flow adjustment unit and the source is established within the source. Thus, the fluidic coupling point may be a temporary fluidic coupling point (such as a temporary fluidic T-junction) which is established only in a specific switching state of the fluidic valve, but is absent in another switching state of the fluidic valve.

Embodiments of the above described sample management device may be implemented in or functionally connected to conventionally available HPLC systems, such as the Agilent 1200 Series Rapid Resolution LC system or the Agilent 1100 HPLC series (both provided by the applicant Agilent Technologies—see www.agilent.com).

One embodiment of a sample separation apparatus or system, in which a sample management device of the above-described type may be implemented, comprises a pumping apparatus as fluid drive or mobile phase drive having a pump piston for reciprocation in a pump working chamber to compress liquid in the pump working chamber to a high pressure at which compressibility of the liquid becomes noticeable.

The separation unit of the sampling unit may comprise a chromatographic column providing the stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (100 to 1500 bar), and more particularly 50-120 MPa (500 to 1200 bar).

The sample separation apparatus or system, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1100 HPLC series, both provided by the applicant Agilent Technologies.

Embodiments of the present disclosure can be partly or entirely embodied or supported by one or more suitable software programs or products (or software), which may be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) may be applied in or by the control unit, e.g. a data processing system such as a computer, such as for executing any of the methods described herein. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present disclosure will be readily appreciated and become better understood by reference to the following more detailed description of embodiments in connection with the accompanying drawings. Features that are substantially or functionally equal or similar will be referred to by the same reference signs.

Figures 1, 2:
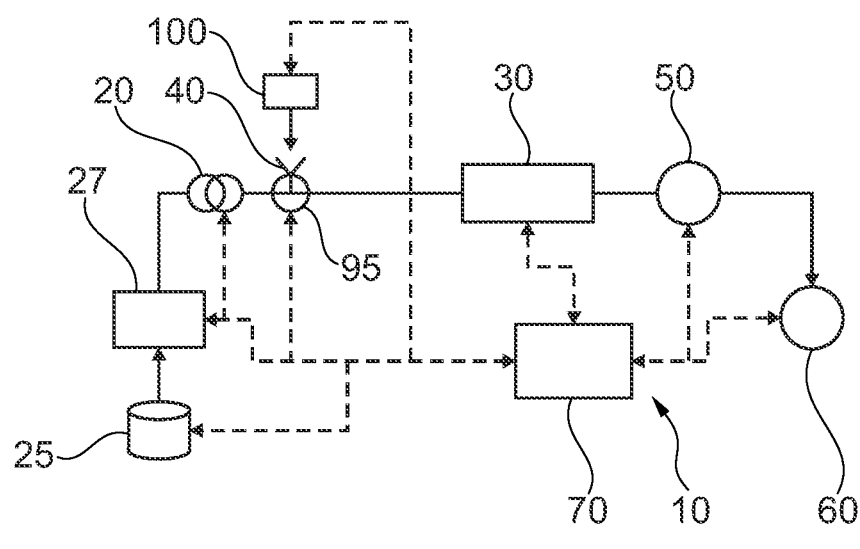
FIG. 1 shows a liquid sampling unit in accordance with embodiments of the present disclosure, particularly used in high performance liquid chromatography (HPLC).
FIG. 2 illustrates a sample management device according to an exemplary embodiment of the present disclosure.

The illustrations in the drawings are schematic.

DETAILED DESCRIPTION

Before describing the figures in further detail, some basic considerations of the present disclosure will be summarized based on which exemplary embodiments have been developed.

According to an exemplary embodiment of the present disclosure, a punctual junction or temporary fluidic coupling point to a reactor or any other source can be selectively established for branching off a portion of the fluidic sample without disturbing the source.

An embodiment of the present disclosure is hence related to a punctual junction to a reactor. The intention is to draw reactor fluid out of a continuously pumped (for example by reactor pressure) flow without compromising the reactor fluid itself.

In such a configuration, it is possible to draw reactor fluid from a continuously pumped (for example by reactor pressure) reactor. A metering device (or any other embodiment of a volume flow adjustment unit adjusting a volume flow of the fluidic sample to be branched off) can be flushed by itself, with the usage of passive or active valves (for instance a check valve).

A draw or branch off from a continuously pumped reactor fluid as an example for a fluidic sample can be carried out without compromising the source with pressure fluctuations, in particular when using one or more built-in pressure sensors, which provides the opportunity of a precise pre- and/or depressurization of a loop (as an example for a sample accommodation volume), a needle, a seat and/or the metering device.

Moreover, the metering device may be configured to be self-purgeable with fresh solvent which can be provided by one or more solvent containers connected to a solvent selection valve or a solvent container directly connected to the metering device. In addition, any solvent (in particular quenching solvent) can be dispensed via a metering device to control the reactor fluid.

Quench solvent can be dispensed after sample taking, and therefore the reactor fluid may be safely prevented from being affected by contaminants.

The draw volume may be selectable substantially without limitations, in particular may be selectable within a range of a maximum volume of the loop installed. A pressure stable operation is possible, for instance up to 1300 bar or more. The reaction in the reactor can be controlled by feed injection. It is also possible to dispense control fluids into the reactor fluid path/source.

Referring now in greater detail to the drawings, FIG. 1 depicts a general schematic of a liquid sampling unit 10 according to an exemplary embodiment of the present disclosure. A pump as fluid drive 20 receives a mobile phase from a solvent supply 25, typically via a degasser 27, which degases and thus reduces the amount of dissolved gases in the mobile phase. The mobile phase drive or fluid drive 20 drives the mobile phase through a separation unit 30 (such as a chromatographic column) comprising a stationary phase. A sampler or injector 40, implementing a fluidic valve 95, can be provided between the fluid drive 20 and the separation unit 30 in order to subject or add (often referred to as sample introduction) a sample fluid into the mobile phase. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 might be comprised of plural individual pumping units, with plural of the pumping units each receiving and pumping a different solvent or mixture, so that the mixing of the mobile phase (as received by the separation unit 30) occurs at high pressure and downstream of the fluid drive 20 (or as part thereof). The composition (mixture) of the mobile phase may be kept constant over time, the so-called isocratic mode, or varied over time, the so-called gradient mode.

A data processing unit or control unit 70, which can be a PC or workstation, may be coupled (as indicated by the dotted arrows) to one or more of the devices in the sampling unit 10 in order to receive information and/or control operation. For example, the control unit 70 may control operation of the control unit 20 (e.g. setting control parameters) and receive therefrom information regarding the actual working conditions (such as output pressure, etc. at an outlet of the pump). The control unit 70 may also control operation of the solvent supply 25 (e.g. setting the solvent/s or solvent mixture to be supplied) and/or the degasser 27 (e.g. setting control parameters such as vacuum level) and might receive therefrom information regarding the actual working conditions (such as solvent composition supplied over time, vacuum level, etc.). The control unit might further control operation of the sampling unit or injector 40 (e.g. controlling sample injection or synchronization of sample injection with operating conditions of the fluid drive 20). The separation unit 30 might also be controlled by the control unit 70 (e.g. selecting a specific source or column, setting operation temperature, etc.), and send—in return— information (e.g. operating conditions) to the control unit 70. Accordingly, the detector 50 might be controlled by the control unit 70 (e.g. with respect to spectral or wavelength settings, setting time constants, start/stop data acquisition), and send information (e.g. about the detected sample compounds) to the control unit 70. The control unit 70 might also control operation of the fractionating unit 60 (e.g. in conjunction with data received from the detector 50) and provides data back.

As illustrated schematically in FIG. 1, the fluidic valve 95 and the injector 40 may cooperate with a sample management system 100 (embodiments of which being described in the following figures) which may branch off a fluidic sample from a source (not shown in FIG. 1) for separation by the sampling unit 10. The control unit 70 may also control operation of the sample management system 100. Hence, FIG. 1 indicates that the injector 40 of the sampling unit 10 according to FIG. 1 can be embodied as sample management system 100, or as part thereof, or may functionally cooperate with a sample management system 100.

Figure 3:
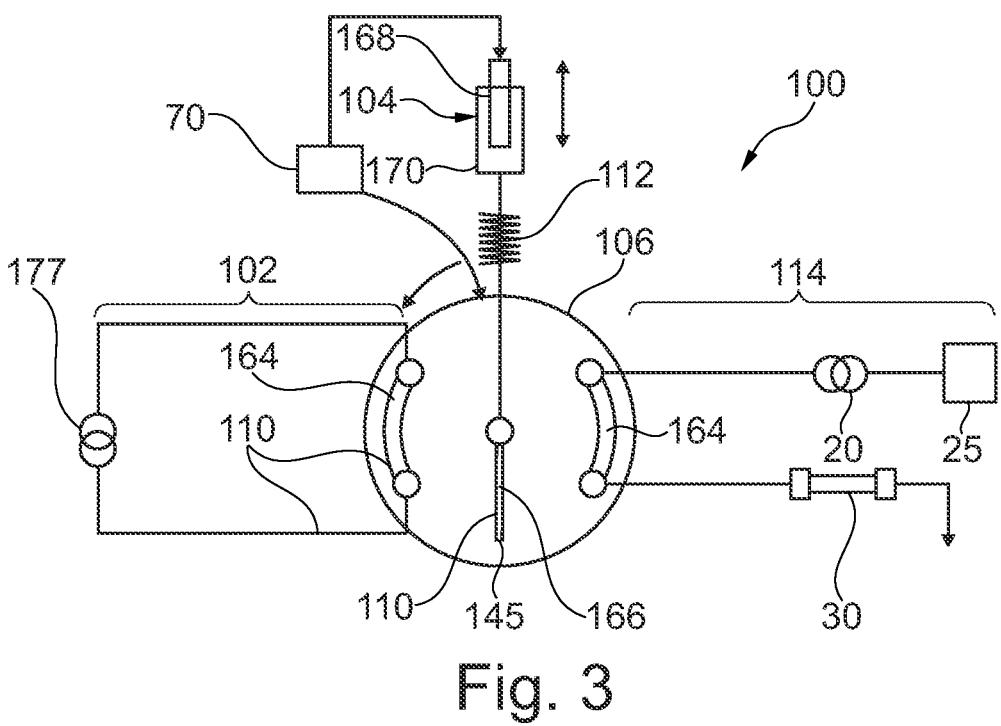
FIG. 3 illustrates the sample management device shown in FIG. 2 in a different switching state.
Figure 4:
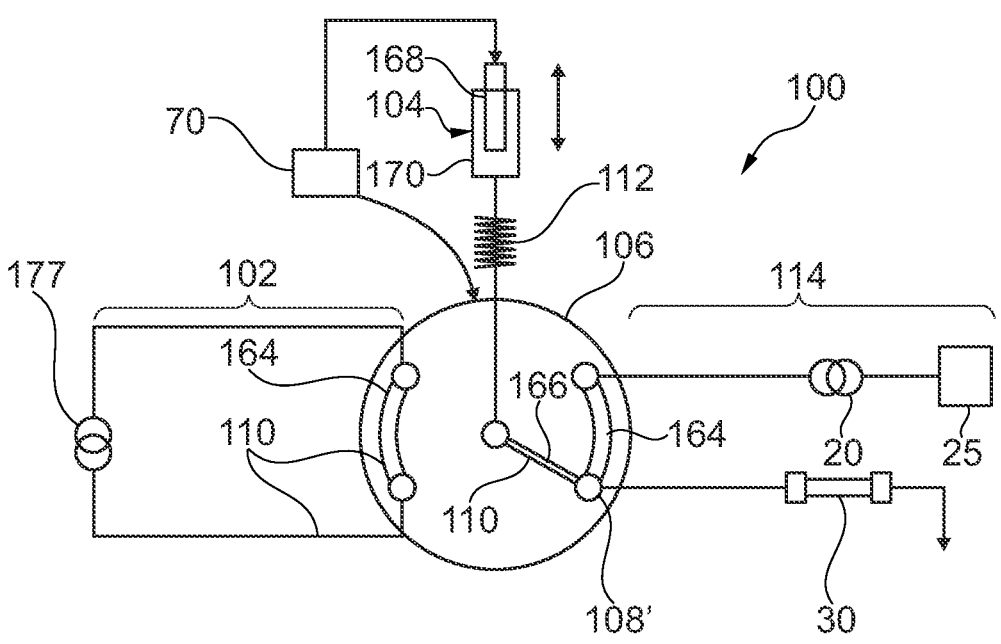
FIG. 4 illustrates the sample management device shown in FIG. 2 in a different switching state.

FIG. 2 to FIG. 4 illustrate a sample management system 100 according to an exemplary embodiment of the present disclosure in different switching states.

Referring to FIG. 2, a sample management system 100 is provided with a source 102 in which a fluidic sample can flow. In FIG. 2, the source 102 can be any kind of source (e.g. a reservoir such as a drinking water reservoir), reactor, process which processes a fluidic sample, for instance a continuous beverage production system, et cetera. Within such a source 102, a fluid drive 177 (such as a fluid pump) may be arranged for driving the fluidic sample along the source 102. In the shown embodiment, the source 102 is represented for closed-loop fluid processing which is indicated schematically in FIG. 2 by reference numeral 169. Moreover, the sample management system 100 comprises a volume flow adjustment unit 104 configured for adjusting a volume or volume flow of the fluidic sample to be branched off from the source 102 at a temporary fluidic coupling point 108. It is clear, however, that the source 102 may also be provided for open-loop fluid processing, e.g. with the fluidic coupling point 108 being connected to waste.

The volume flow adjustment unit 104 may be configured as a metering unit configured for metering fluidic volumes in a very controlled manner. A fluidic valve 106 is fluidically coupled with the source 102 and with the volume flow adjustment unit 104.

Advantageously, the fluidic valve 106 is switchable into a branch off state (as shown in FIG. 2) in which the temporary (i.e. only present in the branch off state, while being absent in other switching states of the fluidic valve 106, compare FIG. 3 and FIG. 4) fluidic coupling point 108 is established as T-junction within (or is generated as T-junction within) the source 102 to branch off an adjustable volume of the fluidic sample from the source 102 via the fluidic coupling point 108 while a flow of the fluidic sample within the source 102 continues. In the shown configuration, the fluidic coupling point 108 is fluidically coupled into the source 102 and into a volume flow adjustment path guiding to the volume flow adjustment unit 104 as a consequence of this switching operation. Advantageously, the fluidic valve 106 is configured so that a flow of the fluidic sample in the source 102 continues substantially undisturbed and uninterruptedly in the branch off state. As can be taken from FIG. 2, the fluidic coupling point 108 is located as a fluidic port in an interior of the fluidic valve 106. As can furthermore be taken from FIG. 2, the fluidic valve 106 is configured so that the volume flow adjustment unit 104 is fluidically coupled with the source 102 via the fluidic coupling point 108. The latter has three fluid connections 110 defined by the fluidic valve 106 in the branch off state. Two of the three fluid connections 110 at the fluidic coupling point 108 are fluidically coupled to the source 102 (or form part thereof), and another one of the three fluid connections 110 is fluidically coupled to the volume flow adjustment unit 104 (or forms part of the volume flow adjustment path). The three fluid connections 110 correspond to two valve-internal fluidic conduits and one valve-external fluidic conduit, which are fluidically coupled with one another at the fluidic coupling point 108 in the branch off state. More precisely, one fluidic conduit (see stator groove 164) relates to a stator and one fluidic conduit (see rotor groove 166) relates to a rotor of the fluidic valve 106. The fluidic coupling point 108 corresponds to or is positioned at a fluid port of the stator of the fluidic valve 106.

According to FIG. 2, the volume flow adjustment unit 104 comprises an adjustment pump in form of a piston-driven metering pump being configured for adjusting the volume flow of the fluidic sample to be branched off from the source 102 (wherein a pumping pressure may be measured by one or more pressure sensors, not shown in FIG. 2, wherein the measured pressure may be used for control purposes). More specifically, the volume flow adjustment unit 104 is configured for adjusting the volume of the fluidic sample to be branched off from the source 102 by piston motion. As can be taken from FIG. 2, the volume of the fluidic sample branched off from the source 102 flows into a sample accommodation volume 112, which can be embodied as a sample loop.

The sample management system 100 according to FIG. 2 furthermore has a sampling unit 114 which is also fluidically coupled with other ports of the fluidic valve 106. The fluidic valve 106 is switchable into a sample supply state, shown in FIG. 4, in which the previously branched off fluidic sample is supplied into the sampling unit 114. The sampling unit 114 may be embodied as a liquid chromatography unit such as an HPLC unit, and is capable of separating a branched off fluidic sample into fractions.

Hence, the volume flow adjustment unit 104 is here embodied as a metering pump having a piston 168 reciprocating in a piston chamber 170, controlled by control unit 70. For instance, by moving upwardly according to FIG. 2, the piston 170 may draw or intake a fluidic sample into the sample accommodation volume 112. By moving downwardly referring to FIG. 2, the piston 170 may inject a previously intaken fluidic sample, which has been temporarily stored in the sample accommodation volume 112, towards and into the sampling unit 114. The sampling unit 114 is here configured for liquid chromatography separation of the injected branched off fluidic sample, as indicated by members 25, 20, 30 described in FIG. 1.

In order to activate the branch off state shown in FIG. 2, the rotor of fluidic valve 106 is switched so that the rotor groove 166 is fluidically coupled with the stator groove 164 so that the fluidic coupling point 108 is generated or established. Thus, the fluidic coupling point 108 as fluidic T-piece is temporarily established, i.e. limited to a certain switching state of the fluidic valve 106. Depending on the conditions in the source 102 and the conditions in the fluidic conduit connecting the fluidic coupling point 108 with the volume flow adjustment unit 104, it is defined which amount of fluidic sample is split at the fluidic coupling point 108 and branched off into the sample accommodation volume 112. During this branching off or splitting of the flow, the pressure conditions and the entire process in the source 102 remain undisturbed.

According to FIG. 2, the fluidic valve 106 has:

a source flow-in port (see reference numeral IN) through which the fluidic sample can be guided to flow from the source 102 into the fluidic valve 106;

a source flow-out port (see reference numeral OUT, which is here equivalent to the fluidic coupling point 108) through which branched off fluidic sample can flow away from the source 102, and not-branched off fluidic sample can simultaneously remain flowing within the source 102; and a branch off port (i.e. the central port of the fluidic valve 106) through which the branched off fluidic sample can flow to sample accommodation volume 112 in fluid communication with the volume flow adjustment unit 104.

As mentioned, the fluidic valve 106 shown in FIG. 2 is configured as a rotor switch valve comprising rotor and stator being rotatable relative to one another. In the shown configuration, the stator comprises a plurality of ports and stator grooves 164 as fluid connections between respective ones of the various ports. Furthermore, the rotor comprises rotor groove 166 which can be brought in fluid communication or out of fluid communication with individual ones of the ports and stator grooves 164 of the stator.

FIG. 3 shows the sample supply device 100 according to FIG. 2 in an intermediate switching state in which the rotor has been further rotated counter-clockwise so that the rotor groove 166 is now fluidically decoupled from both stator grooves 164. For example, in the shown switching position, a flushing task may be executed, if desired. Also, a compression/decompression task is executable. A channel end point 145 of the rotor groove 166 is now a fluidically unconnected dead end. Fluidic coupling point 108 is no longer present or established.

As can be taken from FIG. 4, the sample supply device 100 has been further switched to a supply switch state by further rotating the rotor counter clockwise relative to the stator so as to bring the rotor groove 166 in alignment with one of the ports on the right-hand side of FIG. 4. By taking this measure, movement of the piston 168 in the piston chamber 170 of the volume flow adjustment unit 104 may inject the previously branched off fluidic sample from the sample accommodation volume 112 into the sampling unit 114 for liquid chromatography separation. More precisely, the fluidic sample is injected from the sample accommodation volume 112 into the sampling unit 114 via a further temporary fluidic coupling point 108'. When the fluidic coupling point 108 is established, the further fluidic coupling point 108' is not established, and vice versa. A respective position of the channel end point 145 defines whether the fluidic coupling point 108 is established within the source 102, or whether the further fluidic coupling point 108' is established within the sampling unit 114.

Referring to both switching states according to FIG. 3 and FIG. 4, the fluidic valve 106 is switchable in either of these switching states for further processing the branched off fluidic sample in which the fluidic coupling point 108 is eliminated. By establishing the T-piece type fluidic coupling point 108 only temporarily, i.e. only in the branch off state according to FIG. 2, fluidic sample processing in the source 102 keeps undisturbed while further processing the branched off fluidic sample in a separate flow path according to FIG. 3 or FIG. 4.

In another embodiment, not further detailed in the figures, the source 102 comprises another sample separation apparatus for separating the fluidic sample in fractions, which may be embodied substantially similar to the sampling unit of the sampling unit 114, thus allowing a two-dimensional chromatographic separation.

Figure 5:
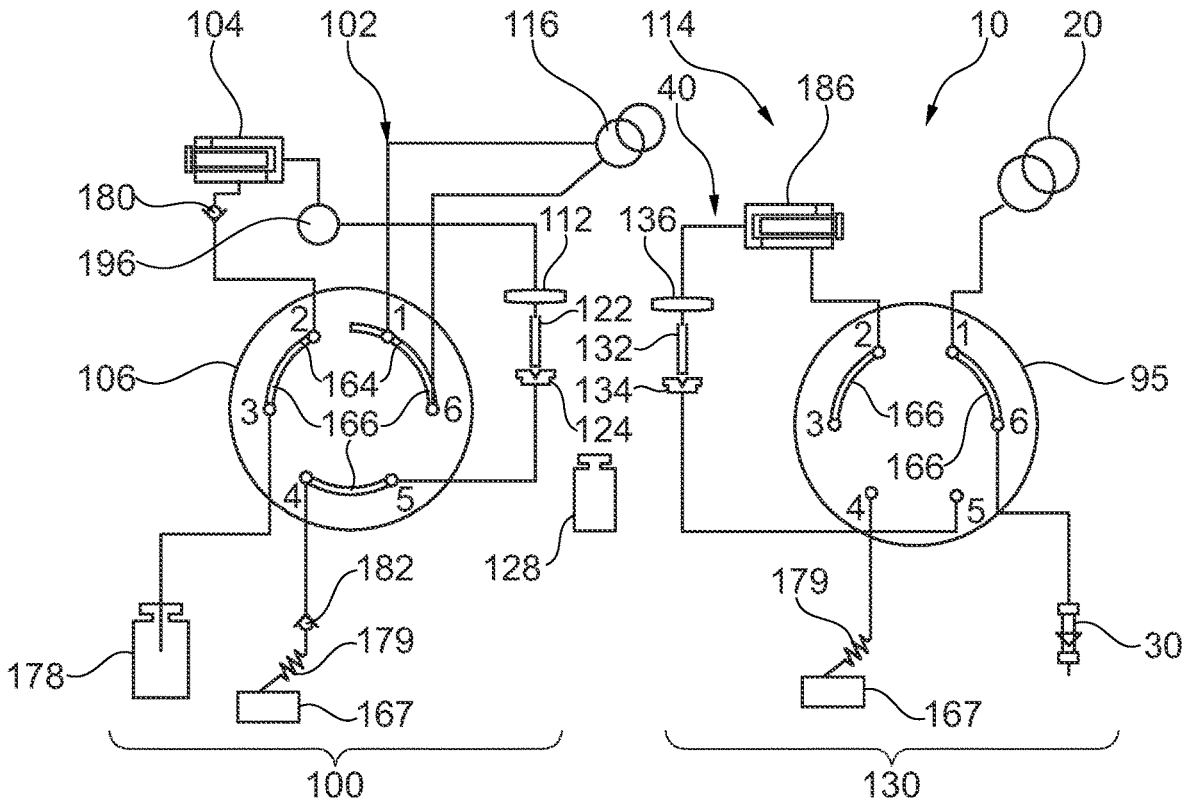
FIG. 5 illustrates a sampling unit with a sample management device according to another exemplary embodiment of the present disclosure in different operation modes and switching states.

FIG. 5 illustrates a sample management system 100 forming part of a sampling unit according to another exemplary embodiment of the present disclosure in different switching states.

The sampling unit 10 is configured for separating a fluidic sample and comprises fluid drive 20 (such as a high pressure pump) configured for driving a mobile phase, separation unit 30 (such as a chromatographic column) configured for separating the fluidic sample in the mobile phase, and sample management system 100 for branching off an adjusted volume the fluidic sample for injection between the fluid drive 20 and the separation unit 30. The source 102 comprises a fluid reactor 116 for subjecting the fluidic sample to a reaction (such as a chemical or biological reaction). A sample separation apparatus 130, including inter alia the fluid drive 20 and the separation unit 30, is provided, into which the branched off fluidic sample is injectable from external entity 128, such as a vial. Furthermore, the sample separation apparatus 130 comprises a further needle 132, a further seat 134 and a further accommodation volume 136. The further needle 132 is drivable selectively into the further seat 134 or out of the further seat 134 for transferring the branched off fluidic sample from the external entity 128 into the further accommodation volume 136 for subsequent injection, via fluidic valve 95, between fluid drive 20 and separation unit 30 for sample separation.

On the left-hand side of FIG. 5, a fluid reactor circuit is shown. A fluidic sample processed in fluid reactor 116 can be branched off using the principle described above referring to FIG. 2 to FIG. 4 via a temporary fluidic coupling point 108. In the switching state according to FIG. 5, however, a reactor pump of the fluid reactor 116 pumps the fluidic sample along a circular path including ports 1 and 6 of the fluidic valve 106 as well as grooves 164, 166 bridging these ports 1, 6. A port 4 is connected via a fluidic restriction 179 towards a waste 167. Furthermore, fluidic ports 4 and 5 are coupled by a further groove 166 and are connected to seat 124, needle 122 and sample accommodation volume 112 to volume flow adjustment unit 104 configured as metering pump. The latter is presently in fluid communication via ports 2, 3 and further grooves 164, 166 of the fluidic valve 106 with a solvent container 178. As can be furthermore taken from the left-hand side of FIG. 7, two check valves 180, 182 are implemented, one between the fluidic restriction 179 and port 4, and the other one between the volume flow adjustment unit 104 and port 2. A pressure sensor is denoted with reference numeral 196.

The sampling unit 10 shown on the left-hand side of FIG. 5 is presently inactive in the configuration according to FIG. 5. Mobile phase drive 20 may drive fluidic sample through fluidic valve 95 and from there to separation unit 30. A metering device 186 is coupled via further accommodation volume 136, further needle 132 and further seat 134 to port 5 of the fluidic valve A further flow path with a fluid restriction 179 and a waste 167 are shown as well.

In the configuration according to FIG. 5, the fluidic valve 106 is in the reactor drainage state. The reactor 116 and connected fluid conduits carry out a circular flow process during which a reaction takes place with the fluidic sample in the circular flow path including the reactor 116. In parallel, a solvent can be filled in from the solvent container 178 into the sample accommodation volume 112. This solvent is transported by a motion of the piston 168 of the volume flow adjustment unit 104 so that solvent flows from the solvent container 178 via port 3, grooves 164, 166 connecting ports 3 and 2, port 2, volume flow adjustment unit 104, pressure sensor 196 and from there into the sample accommodation volume 112. For example, this solvent intake process may help to dilute the fluidic sample with any desired dilution ratio, even with very small amounts of fluidic sample. For instance, 499 μl of solvent may be intaken into the sample accommodation volume 112 which may have a capacity of for instance 500 μl. Thus, the fluidic valve 106 is, according to FIG. 5, in a purge reactor position and pre-fill dilution solvent position. The purge position corresponds to the fluidic path including sample accommodation volume 112, needle 122, seat 124, and volume flow adjustment unit 104. The sample accommodation volume 112 may hence be filled with a calculated amount of dilution solvent after purge. The dilution solvent may be filled into the container 178 (such as a vial) to provide target volumes greater than 500 μl.

By clockwise rotating the fluidic valve 106, not further detailed in FIG. 5, the fluidic valve 106 can be switchable in a pressure adjustment state in which the source 102 is fluidically decoupled from the volume flow adjustment unit 104 and in which the volume flow adjustment unit 104 is operable for adjusting a pressure between the volume flow adjustment unit 104 and the fluidic valve 106. In particular, the volume flow adjustment unit 104 is operable for adjusting the pressure in the pressure adjustment state to reduce a pressure difference with regard to another pressure in the source 102 prior to switching the fluidic valve 106 in the branch off state.

In a pre-compression mode, the circular flow involving the reactor 116 remains the same as shown in FIG. 5. However, a flow connection with two unconnected ends from port 2 through volume flow adjustment unit 104, sample accommodation volume 112, needle 124, seat 122 up to port 5 can be established. By moving the piston 168 of the volume flow adjustment unit 104, the pressure within the described blocked flow path can be increased to a predefined value, for instance from atmospheric pressure to 100 bar. 100 bar may be the pressure in the circular reactor path involving the reactor 116. Thus, the flow path of sample accommodation volume 112, needle 124, seat 122 and volume flow adjustment unit 104 is blocked. The described blocked flow path may be compressed to reactor pressure (wherein pressure can be sensed and monitored using the pressure sensor 196). Such mode can be denoted as reactor drainage mode with a de/compressed position in order to compress to reactor pressure, if desired. It is possible that a quench solution is drawn from a vial position.

By clockwise rotating the fluidic valve 106, not further detailed in FIG. 5, a predefined amount of fluidic sample may be drawn or branched off from the reactor circuit into the sample accommodation volume 112, and the fluidic valve 106 is switched into a branch off state (which corresponds to FIG. 2). The circular flow within the reactor path involving the reactor 116 is only very slightly disturbed, since a small portion of the fluidic sample is branched off at fluidic coupling point 108 towards port 5 and from there through seat 124 and needle 122 into sample accommodation volume 112. The undisturbed branching off the predefined amount of fluidic sample is controlled by the pressure applied by the volume flow adjustment unit 104, which can be sensed by pressure sensor 194. Sensed pressure can be used for monitoring and controlling or even regulating purposes. By pressure control, it can be ensured that the influence of the branch off procedure on the source 102 remains negligibly low.

Advantageously, sample may be drawn up to an extent that the sample accommodation volume 112 is subsequently fully filled. It is recalled that already 499 µl of solvent are located here. Hence, by drawing 1 µl of the fluidic sample into the sample accommodation volume 112, its amount can be precisely controlled and its dilution ratio with solvent can be controlled as well with high accuracy.

The system may assume a draw position in which a predefined amount of fluidic sample can be branched off from the reactor 116 without disturbing the process in the circular reactor path. The sample accommodation volume 112, the needle 124, the seat 122 and the volume flow adjustment unit 104 can be connected to the reactor 116 via junction or fluidic coupling point 108 which has meanwhile been established within the reactor flow path, i.e. within source 102. The establishing of the fluidic coupling point 108 fluidically switches together the source 102 with the volume flow adjustment unit 104. A predefined amount of fluidic sample may be guided out of the reactor circuit without disturbing the reactor disturbance.

By further clockwise rotating the fluidic valve 106, not further detailed in FIG. 5, the system can be transferred into a further decompression state. If desired, the pressure inside the again blocked fluidic path involving the volume flow adjustment unit 104 can be reduced, for instance to atmospheric pressure. In parallel to this and completely undisturbed and uninterrupted by the fluid draw process described above, the fluidic sample remaining in the reactor circuit or source 102 continuously flows uninterruptedly.

By further clockwise rotating the fluidic valve 106, not further detailed in FIG. 5, the fluidic sample which has been intaken from the reactor circuit and which has been diluted with the solvent can be filled into container or entity 128. For this purpose, the needle 122 can be driven out of the seat 124 and into the container-type entity 128. Subsequently, the further needle 132 can be driven out of the further seat 134 and may be immersed into the diluted fluidic sample in the entity 128. After this, the diluted fluidic sample branched off from the source 102 is located in the further sample accommodation volume 136 and can be separated by the sampling unit 10. For this purpose, the fluidic valve 95 can be switched into a position in which the mobile phase drive 20 drives the branched off and transferred fluidic sample from the further sample accommodation volume 136 towards the sampling unit 30, such as a chromatographic separation column.

The embodiments of the sample management system 100 shown in FIGS. 2-5 allow transfer of fluid between the source 102 and the sampling unit 114 in either direction, i.e. a transfer of fluid from the source 102 into the sampling unit 114 (in particular for providing a chromatographic separation of at least a portion of the transferred fluid) as well as a transfer of fluid from the sampling unit 114 into the source 102 (for example a quench solvent can be dispensed after sample taking for controlling a reaction, e.g. pH adjustment, or for providing a self-test).

Figure 6:
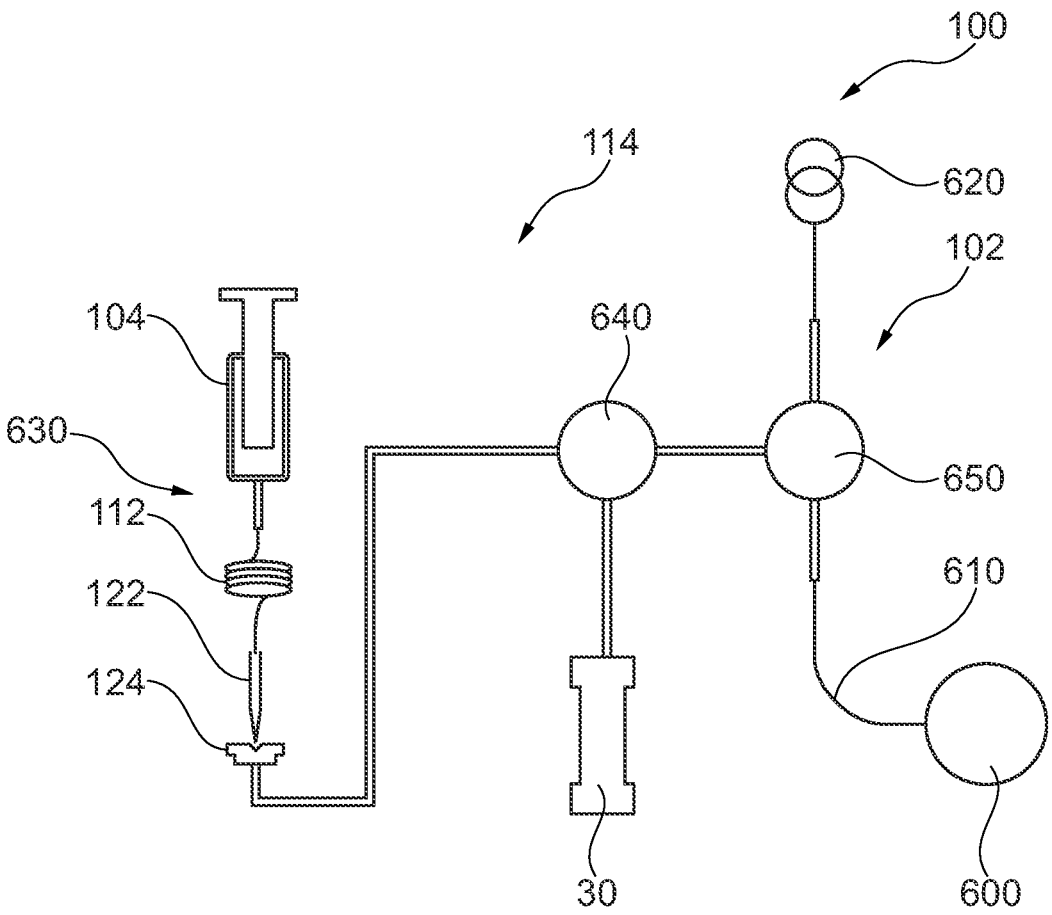
FIG. 6 schematically illustrates an embodiment of a sample management system according to the present disclosure.

FIG. 6 schematically illustrates an embodiment of the sample management system 100 allowing an automated system check out and troubleshooting procedure in particular to verify operation of the sampling unit 114 without (or at least with limited) influence on the source 102, which may be a reactor 600 with a reactor flow path 610 branched off from the reactor 600. The troubleshooting procedure can be provided to verify whether there may be an issue on the side of the sampling unit 114 and/or on the side of the source 102. As the two sides may be provided by different vendors, the procedure may gain importance for the product support of both vendors.

The reactor flow path 610 may be provided for allowing the sampling unit 114 to draw samples from a reactor fluid branched off from the reactor 600 and channeled through the reactor flow path 610. A flow in the reactor flow path 610 might be supported by a pump 620, schematically shown in the embodiment of FIG. 6 drawing reactor fluid from the reactor 600 into the reactor flow path 610. It is clear that the pump 620 may also be located in another position within the source 102 e.g. for pushing rather than drawing/pulling the reactor fluid. In an alternative embodiment, the flow of the reactor fluid within the reactor flow path 610 may be provided passively, i.e. without support by an active device such as the pump 620.

In the schematic representation of FIG. 6, the sampling unit 114 comprises a sampling unit 630 configured for metering fluidic volumes, an injection valve 640 configured for injecting fluid for chromatographic separation by the chromatographic column 30, and a sampling valve 650 configured for transferring fluid between the sampling unit 114 and the source 102. The injection valve 640 and the sampling valve 650 may be embodied by one or plural physical valve elements, for example by one or more rotational valves similar to those depicted in the embodiments of FIGS. 2-5. The sampling unit 630 may be provided by or similar to one or more of the volume flow adjustment unit 104, the sample accommodation volume 112, the needle 122, and the seat 124 as detailed in the embodiments of FIGS. 2-5.

In a "normal mode of operation" of the sample management system 100, the sampling unit 114 may draw fluidic samples from the source 102 and chromatographically separate such drawn fluidic samples. This may be provided, for example following a given time pattern, to monitor the source 102, for example to monitor a biological and/or chemical reaction occurring in the reactor 600.

In order to monitor proper operation of the sample management system 100 and in particular proper operation of the sampling unit 114, a "troubleshooting procedure" may be executed for example following a given time pattern (e.g. following given time intervals). In short, the troubleshooting procedure may be for the sampling unit 114 to provide a representative test sample (e.g. taken out of an external vial) and inject the test sample into the source 102, such as into the reactor flow path 610. After injection of the test sample into the source 102, the sampling unit 114 may be purged in order to remove any remaining portion of the test sample within the sampling unit 114 as best as possible or at least to a certain extent. The sampling unit 114 can then draw fluid from the source 102 which should contain at least a portion of the test sample, and the sampling unit 114 may chromatographically separate the drawn fluid (which should contain the portion of the test sample). Comparing an actual result of the chromatographic separation of the drawn fluid with a reference result for the test sample may then allow to conclude on a proper operation in particular of the sampling unit 114. This can be considered as a "self-test" in that the sampling unit 114 is "simulating" the source 102 by injecting the known test sample into the source 102 and drawing back at least a portion of the injected test sample from the source 102.

It goes without saying that such "simulation" of the source 102 requires that at least a portion of the test sample after injection into the source 102 can still be received (e.g. drawn) into the sampling unit 114. This may be achieved or supported by reducing or pausing an active flow within the source 102, e.g. by reducing or pausing operation of the pump 620 to ensure that a volume of the reactor fluid drawn by the sampling unit 114 after injection of the test sample will still contain at least a portion of the test sample.

In more detail based on the schematic embodiment of FIG. 6, the troubleshooting procedure may be provided by the volume flow adjustment unit 104 taking in the representative test sample and into the sample accommodation volume 112 (e.g. via the needle 122 taken off from the seat 124 and aspirating the test sample from an external vial not shown in FIG. 6) and injecting the test sample via the sampling valve 650 into the reactor flow path 610 of the source 102. After injection of the test sample into the reactor flow path 610, the flow path between the volume flow adjustment unit 104 and the sampling valve 650 may be purged in order to remove remaining test sample as best as possible or at least to a certain extent. The volume flow adjustment unit 104 can draw via the sampling valve 650 fluid from the reactor flow path 610 into the sample accommodation volume 112, which drawn in fluid should contain at least a portion of the injected test sample. The volume flow adjustment unit 104 can eject at least a portion of the volume contained in the sample accommodation volume 112 (containing the drawn in portion of the test sample) via the injection valve 640 for chromatographic separation by the chromatographic column 30.

A more detailed embodiment of the sample management system 100 and mode of operation for a "self-test" procedure shall be explained the following with respect to FIGS. 7A-7E.

Figure 7A:
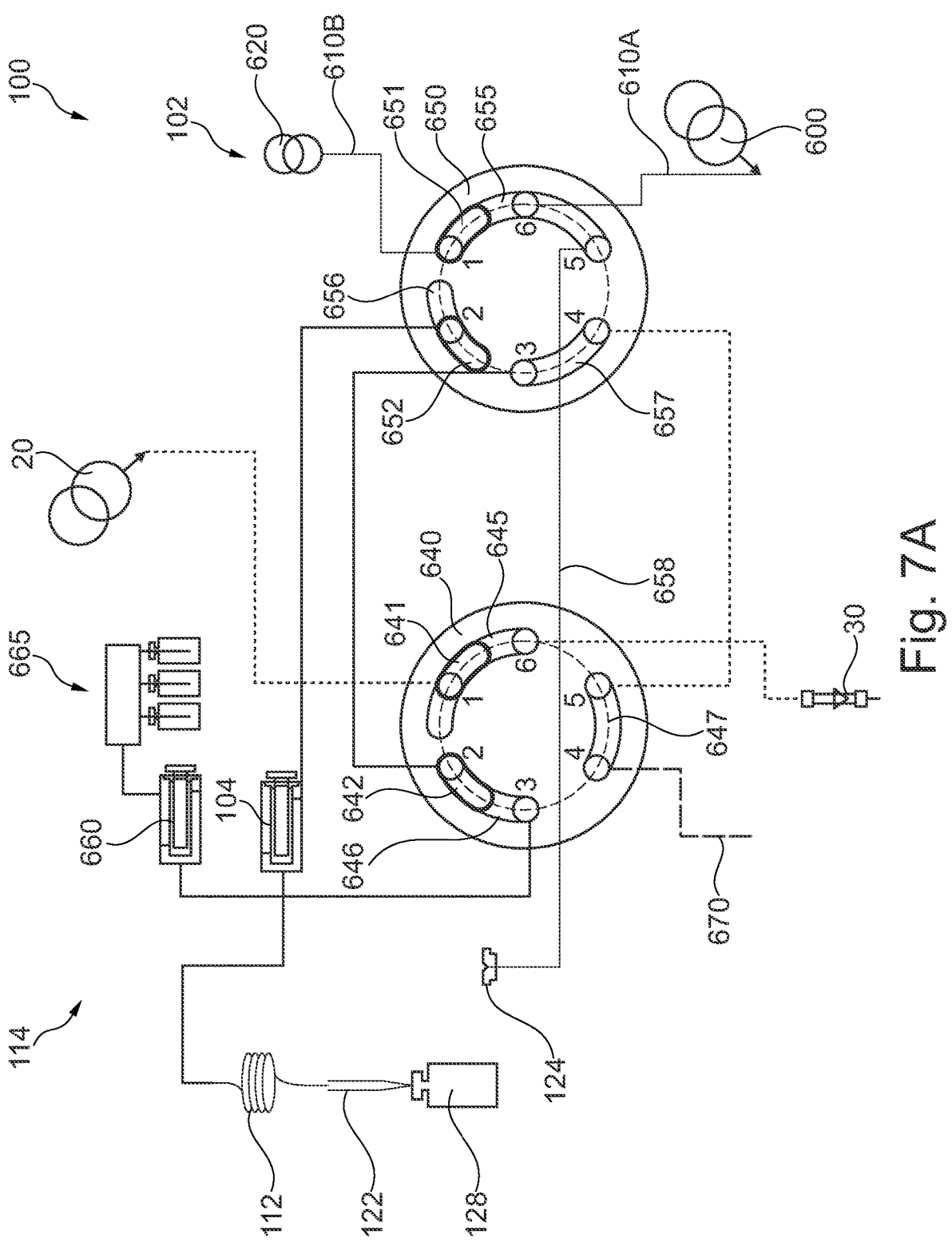
FIG. 7A illustrates a more detailed embodiment of the sample management system and mode of operation for a "self-test" procedure.

FIG. 7A depicts a first configuration "draw checkout sample" for receiving a test sample from an external container, such as the external entity 128, which may be e.g. a vial. The needle 122 is displaced from the seat 124 in order to aspirate the test sample from the vial 128 into the sample accommodation volume 112 by operating the volume flow adjustment unit 104 (which is blocked on one end coupled to a blocked port 2 of the sampling valve 650). The sampling valve 650 may be embodied as a rotational valve having a stator with six ports 1-6 and two stator grooves 651 and 652 and a rotor having three rotational grooves 655, 656, and 657. By rotation of the rotor, the rotational grooves 655, 656, and 657 can assume different positions with respect to the six ports 1-6 and two stator grooves 651 and 652 of the stator of the sampling valve 650, thus allowing fluidic coupling between the ports of the sampling valve 650, as will also become clear from the following description.

The injection valve 640 in the embodiment of FIG. 7 may also be embodied as a rotational valve having a stator with six ports 1-6 and two stator grooves 641 and 642 and a rotor having three rotational grooves 645, 646, and 647. By rotation of the rotor, the rotational grooves 645, 646, and 647 can assume different positions with respect to the six ports 1-6 and two stator grooves 641 and 642 of the stator of the injection valve 640, thus allowing fluidic coupling between the ports of the injection valve 640, as will also become clear from the following description.

Further in FIG. 7A, the reactor 600 is coupled via a reactor flow path 610A to port 6 of the sampling valve 650, and a reactor flow path 610B couples from port 1 of the sampling valve 650 and may further comprise the pump 620 allowing to drive the reactor fluid branched off from the reactor 600. Both reactor flow paths 610A and 610B are part of the reactor flow path 610. The reactor flow path 610 may either be just a branch off from the reactor 600 or may be a closed loop starting from and ending in the reactor 600.

The seat 124 is coupled via a line 658 to port 5 of the sampling valve 650. Port 4 of the sampling valve 650 is coupled to port 5 of the injection valve 640. Port 3 of the sampling valve 650 is coupled to port 2 of the injection valve 640.

The fluid drive 20 is coupled to port 1 of the injection valve 640. Port 3 of the injection valve 640 is coupled to a flush pump 660 which is coupled on the other side to one or more flush solvents 665. Port 4 of the injection valve 640 is coupled to an output which may be a waste 670. Port 6 of the injection valve 640 is coupled to the chromatographic column 30.

In the switching configuration shown in FIG. 7A, the fluid drive 20 is coupled via rotational groove 645 with the chromatography column 30. The reactor flow path 610A is coupled to the reactor flow path 610B through rotational groove 655.

As illustrated above, the switching configuration of FIG. 7A allows to aspirate the test sample from the vial 128 into the sample accommodation volume 112 by operating the volume flow adjustment unit 104.

Figure 7B:
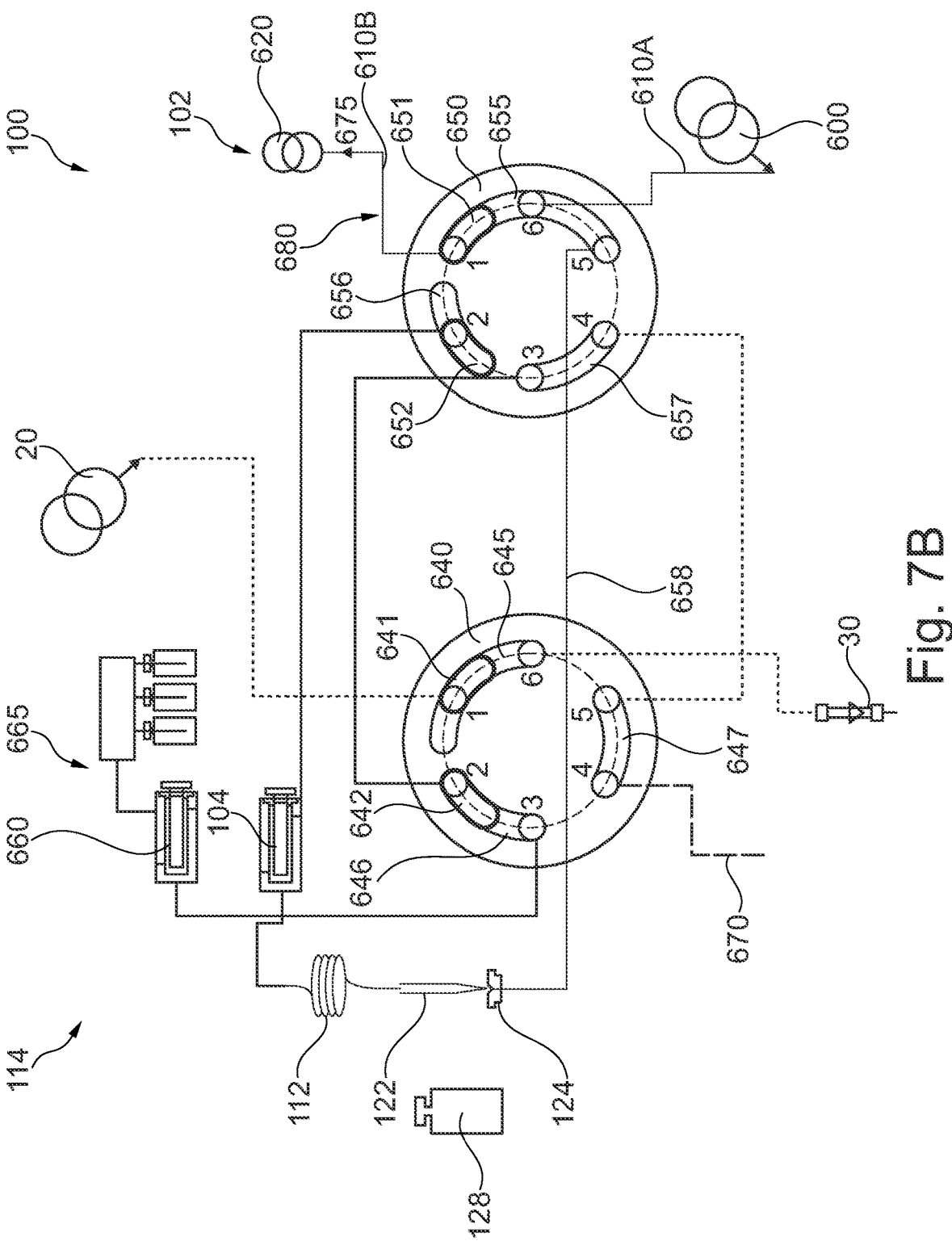
FIG. 7B illustrates the sample management system in a different switching state.

FIG. 7B shows an "Inject into Source" configuration when the needle 122 is moved into the seat 124 coupled via the line 658 to port 5 of the sampling valve 650. In the sampling valve 650, rotational groove 655 and stator groove 651 fluidically couple ports 1, 6 and 5 together. By operating the volume flow adjustment unit 104 (in reverse direction than for aspirating the test sample into the sample accommodation volume 112 as depicted in FIG. 7A), the entire test sample or at least a portion thereof as stored into the sample accommodation volume 112 can be injected into the reactor flow path 610.

The precise location and distribution of the injected test sample within the reactor flow path 610 depends on the actual setup and in particular flow condition within the source 102, for example on a geometry of the reactor flow path 610, a flow rate within the reactor flow path 610, and others. In an example and for the sake of better explanation, assume the pump 620 is slowly drawing in the direction of arrow 675, and the injected test sample is located in an area 680 in the reactor flow path 610B. However, it is clear that the test sample may also be injected into the reactor flow path 610A or into both.

Figure 7C:
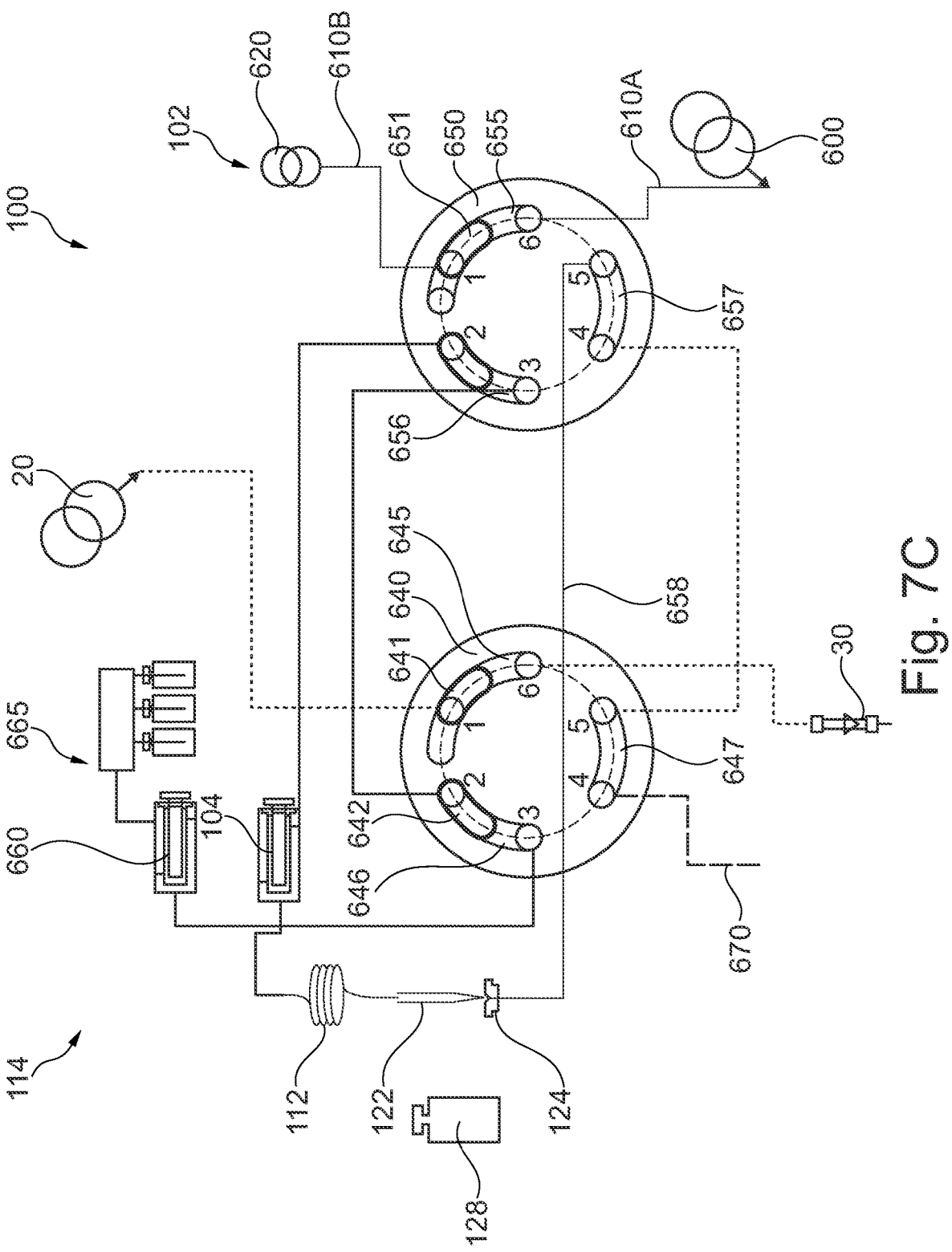
FIG. 7C illustrates the sample management system in a different switching state.

After injection of the test sample into the source 102, as depicted with respect to FIG. 7B, the sample management system 100 may be moved into a "Purge" configuration as depicted in FIG. 7C. With respect to the configuration of FIG. 7B, the rotor of the sampling valve 650 has been rotated (by one port position anticlockwise), so that rotational groove 655 is coupling between ports 1 and 6, thus still coupling reactor flow paths 610A and 610B. Further, ports 2 and 3 are coupled together via rotational groove 656, and ports 4 and 5 are coupled together via rotational groove 657. Accordingly, the flush pump 660 can now pump one or more flush solvents 665, as shown in FIG. 7C, and thus purge in particular the components involved in the previous steps of drawing and injecting the test sample (as explained above with respect to FIGS. 7A and 7B) namely the volume flow adjustment unit 104, the sample accommodation volume 112, the needle 122, the needle seat 124, and the line 658. This allows to remove remaining portions of the test sample at least to a certain extent, thus avoiding or at least reducing potential cross-over from the test sample.

Figure 7D:
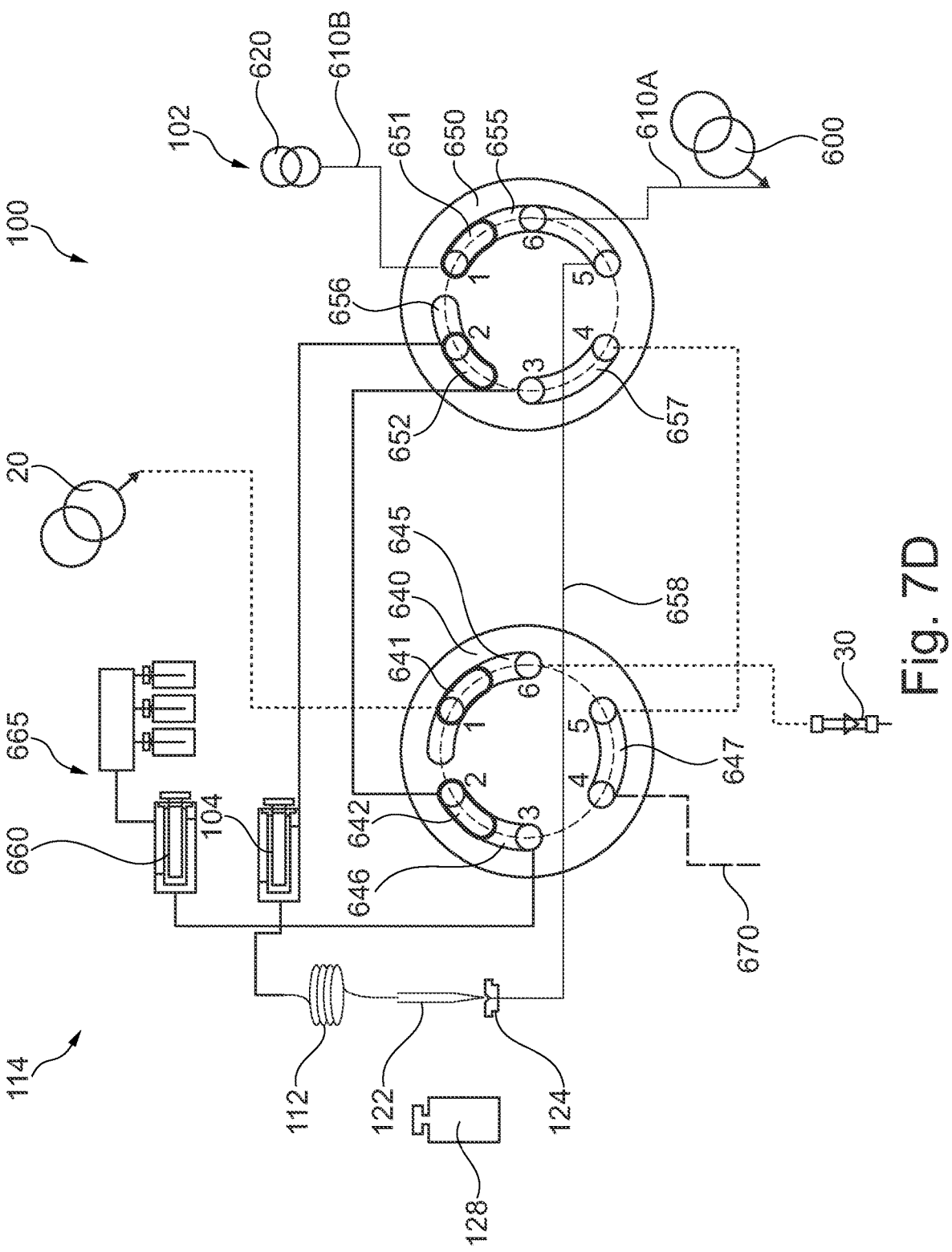
FIG. 7D illustrates the sample management system in a different switching state.

After injection of the test sample into the source 102 (FIG. 7B) and optionally purging (FIG. 7C), the sample management system 100 may be moved into a "Draw" configuration as shown in FIG. 7D. With respect to the configuration in FIG. 7C, the rotor of the sampling valve 650 is rotated into the same position as in FIGS. 7A and 7B, namely clockwise by one port position. Opposite to the "Inject into Source" operation of FIG. 7B, the volume flow adjustment unit 104 is operated in the same direction as in FIG. 7A, i.e. reverse to the direction of FIG. 7B, allowing to draw fluid into the sample accommodation volume 112 from the reactor flow path 610 (e.g. from area 680 indicated in FIG. 7B) at the common coupling point provided by ports 1, 6, and 5 of the sampling valve 650.

The volume of fluid drawn from the reactor flow path 610 into the sample accommodation volume 112 should contain at least a portion of the test sample injected into the reactor flow path 610 in the configuration of above FIG. 7B. This can be ensured, for example, by keeping the time period between injection and drawing as short as possible and/or trying to maintain the injected test sample as close as possible to the common coupling point (provided by ports 1, 6, and 5 of the sampling valve 650) by reducing distribution of the injected test sample within the reactor flow path 610. This may be achieved e.g. by stopping or at least reducing a flow rate within the reactor flow path 610.

Figure 7E:
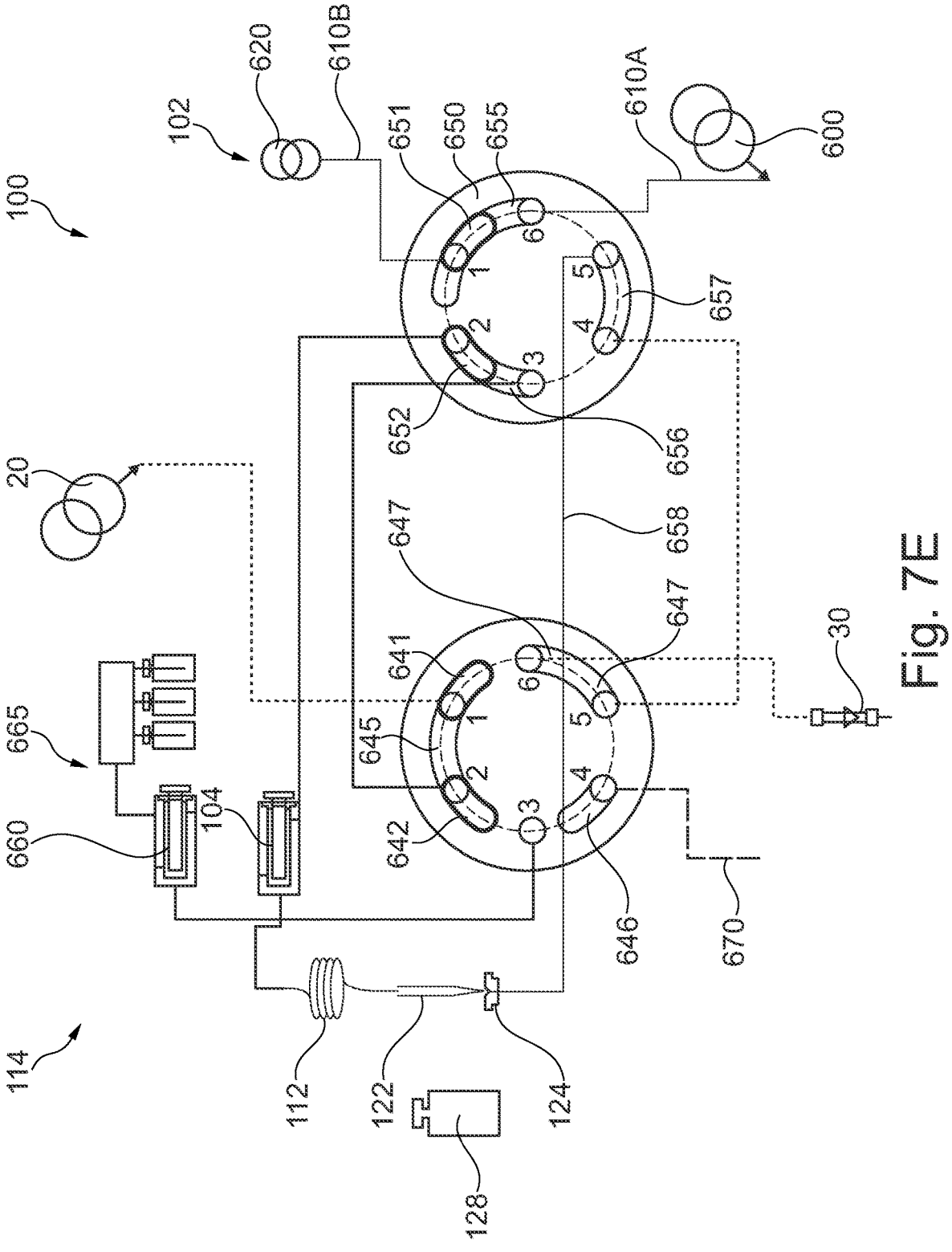
FIG. 7E illustrates the sample management system in a different switching state.

After the "Draw" procedure of FIG. 7D, the sample management system 100 can be moved into an "Inject" configuration as shown in FIG. 7E. The sampling valve 650 is rotated (back) into the position of FIG. 7C or, in other words, rotated by one port position anticlockwise with respect to the configuration of FIG. 7D. The injection valve 640 is rotated by one port position anticlockwise (with respect to the configuration of FIG. 7D), so that the rotational groove 645 couples between ports 1 and 2, rotational groove 647 couples between ports 5 and 6, while rotational groove 646 couples to port 4 (thus "blocking" waste 670). Accordingly, the volume flow adjustment unit 104, the sample accommodation volume 112, and the needle 122 (accommodated within the seat 124) are switched between the fluid drive 20 and the chromatographic column 30, thus injecting the fluidic content stored in the sample accommodation volume 112 into the mobile phase driven by the fluid drive 20 through the chromatographic column for chromatographic separation thereby. This type of injection is often referred to as "flow-through injection".

The executed chromatographic separation of the injected fluidic content of the sample accommodation volume 112 gives an indication on the status of operation and functionality of the sample management system 100, in particular of the sampling unit 114, the source 102 as well as the fluidic coupling in between. When ensuring that at least a portion of the test sample can be drawn back (according to FIG. 7D) from the source 102, the operation as depicted above in FIGS. 7A-7E can be considered as a "self-test" procedure for the sampling unit 114, thus allowing e.g. to verify proper operation of the sampling unit 114.

Proper operation of the sampling unit 114 can be assumed already if the chromatographic separation (FIG. 7E) of the drawn fluid provides an actual result of chromatographic separation. Such actual result may be compared with a reference result for example for the test sample. Such comparison (of actual result with reference result for the test sample) may for example give an indication on a proper quantification of the detected compounds of the chromatographically separated test sample. Further, such comparison may also give an indication on potential cross-contamination and/or whether a purging process (within the sample management system 100, in particular within the sampling unit 114 but also within the source 102) has been successful and sufficient. For example, the comparison may show that a provided purging procedure is not sufficient and e.g. leads to an unacceptable degree of (cross) contamination. On the contrary, different purging procedures may thus be evaluated, e.g. with the result that a certain purging procedure (e.g. characterized by a certain time period provided for purging) is already sufficient, thus leading to avoid unnecessary effort, reducing the time and resources (e.g. a volume of solvents) required for purging.

In case the chromatographic separation (FIG. 7E) of the drawn fluid does not show any compound from the test sample, this can be considered as an indication that the fluidic coupling between the sampling unit 114 and the source 102 is not properly working and/or that the injected test sample cannot be received back from the source 102, e.g. because a flow rate present in the reactor flow path 610 is too high and removing the injected test sample too far away from the fluidic coupling point (e.g. ports 1, 6, and 5 of the sampling valve 650) of the sampling unit 114 to the source 102.

In case the actual result (from the chromatographic separation—FIG. 7E—of the drawn fluid) significantly differs from the reference result of the test sample, e.g. by showing a significant amount of separated compounds different from the compounds present in the test sample, this may be seen as an indication of an unacceptable contamination.

In case the actual result (from the chromatographic separation—FIG. 7E—of the drawn fluid) significantly differs from the reference result of the test sample, e.g. in that one or more compounds of the test sample are not shown in the actual result, this may be seen as an indication of a non-proper operation of the sampling unit 114.

Alternatively or in addition to purging the sampling unit 114 (e.g. as depicted with respect to FIG. 7C), the source 102 and in particular the reactor path 610 may also be subject of a purging process/procedure not further detailed herein.

Figure 8:
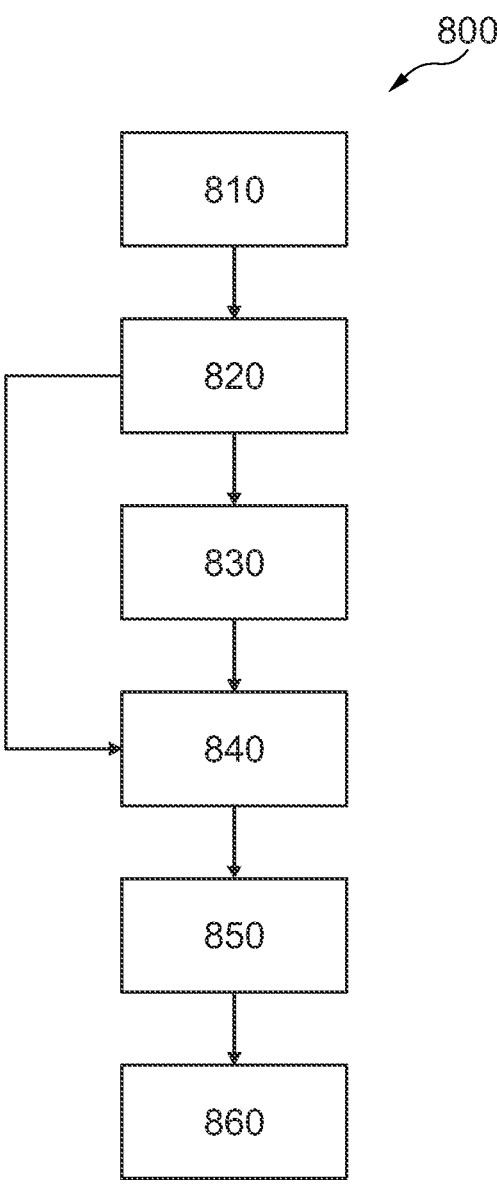
FIG. 8 depicts a flow chart of the operation for a "self-test" procedure in accordance with the description given with respect to FIGS. 7A-7E.

FIG. 8 depicts a flow chart of the operation for a "self-test" procedure 800 in accordance with the explanation given with respect to FIGS. 7A-7E.

Step 810 represents "drawing checkout sample" (FIG. 7A) for receiving the test sample from the external container 128 into the sample accommodation volume 112.

Step 820 (FIG. 7B) represents the "Inject into Source" operation to inject the entire test sample or at least a portion thereof as stored into the sample accommodation volume 112 into the reactor flow path 610.

Step 830 represents "Purging" (FIG. 7C) to purge in particular the components involved in the previous steps 810 and 820 of drawing and injecting the test sample, namely the volume flow adjustment unit 104, the sample accommodation volume 112, the needle 122, the needle seat 124, and the line 658. This allows to remove remaining portions of the test sample at least to a certain extent, thus avoiding or at least reducing potential cross-over from the test sample.

Step 840 represents "Draw" (FIG. 7D) after injection of the test sample into the source 102 (step 820) and optionally purging (step 830). The volume flow adjustment unit 104 is operated to draw fluid into the sample accommodation volume 112 from the reactor flow path 610 which should contain at least a portion of the test sample injected into the reactor flow path 610 in step 820.

After the "Draw" procedure of step 840, the sample management system 100 can be operated in a successive step 850 into an "Inject" configuration (FIG. 7E) for injecting the fluidic content stored in the sample accommodation volume 112 into the mobile phase driven by the fluid drive 20 through the chromatographic column 30 for chromatographic separation thereby.

In a step 860, the status of operation and functionality can be analyzed for the sample management system 100, in particular the sampling unit 114, the source 102 as well as the fluidic coupling in between. When ensuring that at least a portion of the test sample can be drawn back in step 840 from the source 102, the operation of the method 800 can be considered as a "self-test" procedure for the sampling unit 114, thus allowing e.g. to verify proper operation of the sampling unit 114.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A method of testing a sampling unit configured for chromatography, the method comprising:
   providing the sampling unit fluidically coupled to a source, wherein the sampling unit is configured for receiving a fluidic sample from the source and chromatographically separating the received fluidic sample, and the sampling unit comprises a valve;
   operating the sampling unit to introduce a test sample into the source;
   receiving at least a portion of the introduced test sample from the source into the sampling unit by branching off the portion of the introduced test sample from the source, at a fluidic coupling point of the valve, into the sampling unit; and
   chromatographically separating the received portion of the test sample in the sampling unit.

2. The method according to claim 1, wherein receiving the fluidic sample from the source comprises at least one of: removing the fluidic sample from the source; drawing the fluidic sample from the source; branching off the fluidic sample from the source via the valve.

3. The method according to claim 1, further comprising, after introducing the test sample into the source and before receiving the portion of the introduced test sample from the source into the sampling unit:
   purging the sampling unit to remove remaining portions of the test sample within the sampling unit.

4. The method according to claim 1, further comprising, after introducing the test sample into the source and before receiving the portion of the introduced test sample from the source into the sampling unit:
   stopping or at least reducing a flow in the source.

5. The method according to claim 1, further comprising:
   reducing a time period after introducing the test sample into the source and before receiving the portion of the introduced test sample from the source into the sampling unit to ensure that the introduced test sample can still be received.

6. The method according to claim 1, wherein the sampling unit comprises a metering unit configured for metering fluidic volumes, and the method comprises at least one of:
   operating the sampling unit to introduce the test sample into the source comprises using the metering unit to aspirate the test sample;

operating the sampling unit to introduce the test sample into the source comprises using the metering unit to inject the test sample into the source;
   receiving the portion of the introduced test sample from the source into the sampling unit comprises using the metering unit to draw in the portion of the introduced test sample from the source into the sampling unit;
   chromatographically separating the received portion of the test sample in the sampling unit comprises using the metering unit to eject the received portion of the test sample into a high flow high-pressure flow path for chromatographic separating.

7. The method according to claim 1, further comprising:
   comparing an actual result from the chromatographic separation of the received portion of the test sample with a reference result for a chromatographic separation of the test sample; and
   concluding from the comparison of the actual result with the reference result for the test sample on at least one of:
      a proper operation of the sampling unit, in case the actual result and the reference result match within a given threshold;
      a non-proper operation of the sampling unit, in case the actual result and the reference result do not match within a given threshold;
      a proper fluidic coupling of the sampling unit with the source, in case the actual result and the reference result match within a given threshold;
      a non-proper fluidic coupling of the sampling unit with the source, in case the actual result and the reference result do not match within a given threshold;
      a proper quantification of the received portion of the test sample, in case the actual result and the reference result match within a given threshold;
      a proper purging of the source before receiving the test sample from the source, in case the actual result contains one or more other separated compounds than the reference result, preferably beyond a given threshold;
      a proper purging of the sampling unit before receiving the test sample from the source, in case the actual result contains one or more other separated compounds than the reference result, preferably beyond a given threshold.

8. A method of operating a sampling unit fluidically coupled to a source, the method comprising:
   operating the sampling unit to receive a fluidic sample from the source and chromatographically separating the received fluidic sample; and
   testing the sampling unit according to claim 1.

9. The method of claim 8, wherein the source comprises a reactor configured for subjecting the source fluid to at least one of a chemical reaction or a biological reaction.

10. A sampling unit fluidically coupled to a source, wherein the sampling unit is configured for receiving a fluidic sample from the source and chromatographically separating the received fluidic sample, the sampling unit comprising:
   a fluid drive configured to drive a mobile phase;
   a metering unit configured to meter fluidic volumes;
   a separation unit configured to provide a chromatographic separation;
   a valve configured to fluidically couple with the source; and a control unit configured to perform the following:

operating the metering unit to introduce a test sample into the source;

operating the metering unit to draw in at least a portion of the introduced test sample from the source into the sampling unit by branching off the portion of the introduced test sample from the source, at a fluidic coupling point of the valve, into the sampling unit; and operating the metering unit to eject the drawn in portion of the test sample into the mobile phase for chromatographically separating the drawn in portion of the test sample by the separation unit.

11. The sampling unit according to claim 10, wherein the control unit is configured to perform the following:

comparing an actual result from the chromatographic separation of the received portion of the test sample with a reference result for a chromatographic separation of the test sample; and concluding from the comparison of the actual result with the reference result for the test sample on at least one of:

a proper operation of the sampling unit, in case the actual result and the reference result match within a given threshold;

a non-proper operation of the sampling unit, in case the actual result and the reference result do not match within a given threshold;

a proper fluidic coupling of the sampling unit with the source, in case the actual result and the reference result match within a given threshold;

a non-proper fluidic coupling of the sampling unit with the source, in case the actual result and the reference result do not match within a given threshold;

a proper quantification of the received portion of the test sample, in case the actual result and the reference result match within a given threshold;

a proper purging of the source before receiving the test sample from the source, in case the actual result contains one or more other separated compounds than the reference result, preferably beyond a given threshold;

a proper purging of the sampling unit before receiving the test sample from the source, in case the actual result contains one or more other separated compounds than the reference result, preferably beyond a given threshold.

12. The sampling unit according to claim 10, comprising at least one of:

the source comprises a source container configured for containing a source fluid;

the source comprises a source flow path configured for channeling a flow of a source fluid;

the source comprises a source container and a source flow path, wherein the source container is configured for containing a source fluid, and the source flow path is configured for channeling a flow of the source fluid branched off from the source container;

the source comprises a reactor configured for subjecting the source fluid to at least one of a chemical reaction or a biological reaction;

the source flow path comprises a source pump configured for pumping the source fluid;

the source flow path comprises a tubing for channeling the flow of the source fluid.

13. A method of operating a sampling unit configured for chromatography, the method comprising:

providing the sampling unit fluidically coupled to a source, wherein the sampling unit is configured for receiving a fluidic sample from the source and chromatographically separating the received fluidic sample, and the sampling unit comprises a valve;

operating a metering unit of the sampling unit to inject a test sample into the source;

operating the metering unit to draw in at least a portion of the injected test sample from the source by branching off the portion of the injected test sample from the source, at a fluidic coupling point of the valve, into the sampling unit; and chromatographically separating the drawn in portion of the test sample in the sampling unit.

14. The method according to claim 13, comprising operating the metering unit to aspirate the test sample before injecting the test sample into the source.

15. The method according to claim 13, wherein the chromatographically separating comprises operating the metering unit to eject the drawn in portion of the test sample into a high-pressure flow path for chromatographic separating.

16. The method according to claim 15, wherein the operating of the metering unit to eject the drawn in portion of the test sample into the high-pressure flow path is done by flow-through injection or feed injection.

17. The method according to claim 13, further comprising:

comparing an actual result from the chromatographic separation of the received portion of the test sample with a reference result for a chromatographic separation of the test sample; and concluding from the comparison of the actual result with the reference result for the test sample on at least one of:

a proper operation of the sampling unit, in case the actual result and the reference result match within a given threshold;

a non-proper operation of the sampling unit, in case the actual result and the reference result do not match within a given threshold;

a proper fluidic coupling of the sampling unit with the source, in case the actual result and the reference result match within a given threshold;

a non-proper fluidic coupling of the sampling unit with the source, in case the actual result and the reference result do not match within a given threshold;

a proper quantification of the received portion of the test sample, in case the actual result and the reference result match within a given threshold;

a proper purging of the source before receiving the test sample from the source, in case the actual result contains one or more other separated compounds than the reference result, preferably beyond a given threshold;

a proper purging of the sampling unit before receiving the test sample from the source, in case the actual result contains one or more other separated compounds than the reference result, preferably beyond a given threshold.

18. The method according to claim 13, further comprising operating the sampling unit to receive the fluidic sample from the source and chromatographically separating the received fluidic sample.

19. The method according to claim 18, wherein the source comprises a reactor configured to subject the source fluid to at least one of a chemical reaction or a biological reaction.

20. A sampling unit configured for chromatography, the sampling unit comprising:

a fluid drive configured to drive a mobile phase;

a separation unit configured to provide a chromatographic separation; and a control unit configured to control the steps of the method of claim 13 that comprise the operating of the metering unit and the chromatographically separating of the drawn in portion of the test sample.

* * * * *